(12) United States Patent
Schmidlin et al.

(10) Patent No.: US 9,639,099 B2
(45) Date of Patent: May 2, 2017

(54) METHOD FOR REGULATING THE ROOM TEMPERATURE IN A ROOM OR IN A GROUP COMPRISING MULTIPLE ROOMS, AND APPARATUS FOR CARRYING OUT THE METHOD

(71) Applicant: BELIMO Holding AG, Hinwil (CH)

(72) Inventors: Peter Schmidlin, Uster (CH); Norbert Lederle, Laufenburg (DE)

(73) Assignee: BELIMO HOLDING AG, Hinwil (CH)

( * ) Notice: Subject to any disclaimer, the term of this patent is extended or adjusted under 35 U.S.C. 154(b) by 411 days.

(21) Appl. No.: 14/360,585

(22) PCT Filed: Nov. 28, 2012

(86) PCT No.: PCT/CH2012/000263
§ 371 (c)(1),
(2) Date: May 23, 2014

(87) PCT Pub. No.: WO2013/078570
PCT Pub. Date: Jun. 6, 2013

(65) Prior Publication Data
US 2014/0284391 A1    Sep. 25, 2014

(30) Foreign Application Priority Data

Nov. 28, 2011    (CH) ........................ 1890/11

(51) Int. Cl.
*G05D 23/19*    (2006.01)
*F24D 3/14*    (2006.01)
(Continued)

(52) U.S. Cl.
CPC ........... *G05D 23/1927* (2013.01); *F24D 3/14* (2013.01); *F24D 19/1015* (2013.01);
(Continued)

(58) Field of Classification Search
CPC ................ F24D 3/14; F24F 2011/0045; F24F 2011/0063; F24F 2011/0082;
(Continued)

(56) References Cited

U.S. PATENT DOCUMENTS 4,645,908 A * 2/1987 Jones ................ F24D 11/0214
165/240
2011/0000973 A1 1/2011 Do et al.

FOREIGN PATENT DOCUMENTS

EP    1 235 130 A2    8/2002
EP    1 235 131 A2    8/2002
(Continued)

OTHER PUBLICATIONS

FR 2931226 (English Translation).*
(Continued)

*Primary Examiner* — Jonathan Bradford
(74) *Attorney, Agent, or Firm* — Knobbe, Martens, Olson & Bear LLP

(57) ABSTRACT

The present disclosure provides methods and systems for regulating the room temperature in a room or in a plurality of rooms, the room temperature can be regulated by regulating the mass flow of a heat-carrying fluid flowing through a heat exchanger according to a determined current room temperature. In accordance with some embodiments, a temperature sensor in the room can be dispensed that can determine the current room temperature, in each case the mass flow of the heat carrying fluid through the heat exchanger and the flow temperature prevailing at the input to the heat exchanger and the return temperature prevailing at the output of the heat exchanger are measured, and that a temperature assigned to the determined values of the mass (Continued)

flow, the flow temperature and the return temperature is output as the current room temperature and used for regulation.

9 Claims, 3 Drawing Sheets

(51) Int. Cl.
*F24D 19/10* (2006.01)
*F24F 11/00* (2006.01)

(52) U.S. Cl.
CPC ..... *G05D 23/1917* (2013.01); *G05D 23/1932* (2013.01); *F24F 2011/0045* (2013.01); *F24F 2011/0063* (2013.01); *F24F 2011/0082* (2013.01); *F25B 2700/135* (2013.01); *F25B 2700/21174* (2013.01); *F25B 2700/21175* (2013.01); *G05D 23/1931* (2013.01); *Y02B 30/762* (2013.01)

(58) Field of Classification Search
CPC ........ F25B 2600/2511; F25B 2700/135; F25B 2700/1351; F25B 2700/1352; F25B 2700/1353; F25B 2700/2104; F25B 2700/21174; F25B 2700/21175; G05D 23/19; G05D 23/1917; G05D 23/1927; G05D 23/193; G05D 23/1931; G05D 23/1932

See application file for complete search history.

(56) References Cited

FOREIGN PATENT DOCUMENTS

| | | |
|---|---|---|
| EP | 1 770 469 A2 | 4/2007 |
| FR | 2 931 226 A1 | 11/2009 |
| WO | WO 2008/039065 | 4/2008 |
| WO | WO 2009/156010 | 12/2009 |

OTHER PUBLICATIONS

English Translation of the International Search Report dated Jan. 23, 2013, PCT International Application No. PCT/CH2012/000263.
English Translation of the International Preliminary Report on Patentability, PCT International Application No. PCT/CH2012/000263.

* cited by examiner

METHOD FOR REGULATING THE ROOM TEMPERATURE IN A ROOM OR IN A GROUP COMPRISING MULTIPLE ROOMS, AND APPARATUS FOR CARRYING OUT THE METHOD

This application is the U.S. National Phase under 35 U.S.C. §371 of International Application No. PCT/CH2012/000263, filed Nov. 28, 2012, which claims priority to Swiss Application No. 1890/11, filed Nov. 28, 2011.

BACKGROUND

Field of the Invention

The present invention relates to the field of heating and air conditioning technology. It relates to a method for regulating the temperature in a room or in a group comprising a plurality of rooms. It also relates to an apparatus for carrying out the method.

Description of the Related Art

Normally disclosed in the prior art are regulating devices for regulating the room temperature in one or more rooms, with which a temperature sensor arranged in the particular room records the temperature in the room and transmits the value to a regulator which then changes the heat flow supplied to the room if the measured room temperature value does not correspond to a preset setpoint.

A conventional hydraulic control schematic of a heating/cooling system designed for the special field of surface heating/cooling is reproduced in FIG. 1. The surface heating/cooling system shown in FIG. 1 is designed for heating/cooling a plurality of rooms R1, . . . Ri, in which, in each case, a heat exchanger 16 in the form of a pipe coil is laid in the floor, in the wall or in the ceiling. A room temperature sensor/thermostat 17, which records the temperature in each case, is also installed in each of the rooms. In addition, individual temperature sensors can be connected to the central regulator 11 to adapt the regulation. The heat exchangers 16 are connected to a common flow manifold 15 and a return manifold 14. A pump 19 pumps a heat-carrying liquid (fluid) into a group of manifolds. For example, the flow from the flow manifold 15 is optionally supplied by a heat generator 12 or by a chiller 13. Whether the heat generator or the chiller is active depends on the setting of two changeover devices 21 and 22 which optionally connect the heat generator 12 or the chiller 13 to the collector and flow manifolds 14, 15 respectively.

By means of a 3-way valve 20 driven by a motor M, an adjustable quantity of fluid from the return can be mixed with the flow in order to change or regulate the flow temperature. The flow temperature is recorded by a flow temperature probe 18 and transmitted to the central regulator 11. An outside temperature probe 23, which ensures that the flow temperature can be adjusted according to the currently prevailing outside temperature, is connected to the central regulator 11.

The room temperature in the rooms R1, . . . , Ri is regulated by the room temperature regulators 17 which act on the associated control valves V1, . . . , Vi which control the mass flow of the fluid through the appropriate heat exchangers 16.

A disadvantage with this type of heating/cooling and its regulation is that, on the one hand, the results of the regulation depend substantially on the correct positioning of the room temperature sensor, as a result of which the freedom of room design is significantly restricted. On the other hand, the storage effects of the heat exchanger, in particular when using room thermostats, lead to deviations between demand and supply which lead to a temperature drift and an increase in the use of energy.

A method for controlling the flow temperature of a system for transmitting heat energy, which takes into account side-effects, for example heat stored in the brickwork and internal loads, on the control of the energy requirement of a group of rooms, has already been proposed in publication EP 0 282 886 A2. This is achieved in that the energy mass flow consumed in the working medium circuit, and accordingly the flow temperature in the working medium circuit, is determined with the help of a system-specific three-dimensional characteristic block, the dimensions of which are determined by the flow and return temperature and the circulating mass flow of the working medium of the system. Here, the flow temperature is regulated by a 3-way valve in a similar way to that shown in FIG. 1. With a group of rooms/consumers, this type of regulation leads to the flow temperature being adapted to suit the average demand. In doing so, without individual room regulation, an oversupply of individual roomsconsumers or an undersupply of individual rooms/consumers cannot be ruled out.

SUMMARY

It is therefore an object of the invention to specify a method of the kind mentioned in the introduction which avoids the disadvantages of known methods and is distinguished by being able to be easily realized while at the same time having a stable regulating behavior and being flexible in use, and an apparatus for carrying out the method.

This and other objects are achieved by the characteristics of the claims.

The invention starts from a method for regulating the room temperature in a room or in a group comprising a plurality of rooms, in which method the room temperature in a room or in a group comprising a plurality of rooms is regulated by regulating the mass flow of a heat-carrying fluid flowing through a heat exchanger or consumer according to a determined current room temperature. It is characterized in that, in order to determine the current room temperature, in each case the mass flow of the heat-carrying fluid through the heat exchanger and the flow temperature prevailing at the input to the heat exchanger and the return temperature prevailing at the output of the heat exchanger are measured, and that a temperature assigned to the determined values of the mass flow, the flow temperature and the return temperature is output as the current room temperature and used for regulation.

An embodiment of the method according to the invention is characterized in that the current room temperature is output in accordance with a function $$t_{i,j} = F(t_{V,j}, t_{R,j}, m'_j) + t_{corr}(T)$$

in which tV,j and tR,j designate the flow and return temperature respectively and m'j the mass flow at time Tj, and tcorr(T) is a time-dependent correction term which takes into account the thermal storage capacity of the respective heat exchanger or consumer.

In particular, the current room temperature is output according to the function $$t_{i,j} = 0.5 \cdot [(t_{V,j} + t_{R,j}) - (m'_j/m'_0) \cdot ((t_{V,j} - t_{R,j})/(t_{V,0} - t_{r,0})) \cdot (t_{V,0} + t_{R,0} - 2t_{i,0})] + t_{corr}(T),$$

in which ti,0 designates a design room temperature, tV,0 a design flow temperature, tR,0 a design return temperature and m'0 a design mass flow. The time-dependent correction term tcorr(T) is determined as a function of system behavior (heat exchanger, storage mass).

An alternative embodiment of the method according to the invention is characterized in that, in regulating the room temperature, the flow temperature is identical for all heat exchangers or consumers of a group.

A further embodiment of the method according to the invention is characterized in that the mass flow of the heat-carrying fluid through the heat exchanger is changed by means of an associated control valve.

Yet another embodiment of the method according to the invention is characterized in that the heat exchanger is part of a surface heating/cooling system.

The apparatus according to the invention comprises a heat exchanger, which is actively connected to the room to be regulated and which is connected by an input to a flow line and by an output to a return line, a control valve which controls the mass flow through the heat exchanger, a flow temperature sensor which records the flow temperature in the flow line, a return temperature sensor which records the return temperature in the return line, and a flow sensor which records the mass flow through the heat exchanger. It is characterized in that a control unit with at least three inputs and one output is provided, the inputs of which are connected to the flow temperature sensor, the return temperature sensor and the flow sensor, and the output of which is actively connected to the control valve.

An embodiment of the device according to the invention is distinguished in that the control unit comprises an assignment part and a regulator part, wherein the assignment part is designed to assign a room temperature to the values applied to the inputs for the mass flow, the flow temperature and the return temperature, and that the regulator part is designed to actuate the control valve according to the deviation of the assigned room temperature from a prespecified setpoint.

An alternative embodiment is characterized in that the flow sensor and the control valve are arranged in the return line.

A further embodiment is characterized in that the heat exchanger is part of a surface heating/cooling system.

BRIEF DESCRIPTION OF THE DRAWINGS

The invention is explained in more detail below with reference to exemplary embodiments in conjunction with the drawings.

DETAILED DESCRIPTION

The method and the apparatuses for one or a group of surface heating or cooling systems (hereinafter referred to as consumers) in particular relates to a method for individual room temperature regulation with motorized control valves for regulating the flow or energy respectively through the consumer in order to maintain the room temperature constant for changes in load, e.g. a change in the internal load due to people (disturbance step), or in order to adjust the room temperature in the case of user intervention (setpoint change).

The method is distinguished in that the regulation is based on the measurement and evaluation of the energy supplied and dissipated (flow through the consumer, flow and return temperature of the consumer) by means of program code taking into account the thermodynamic relationships, and therefore a direct measurement of the room temperature is not necessary.

Figure 1:
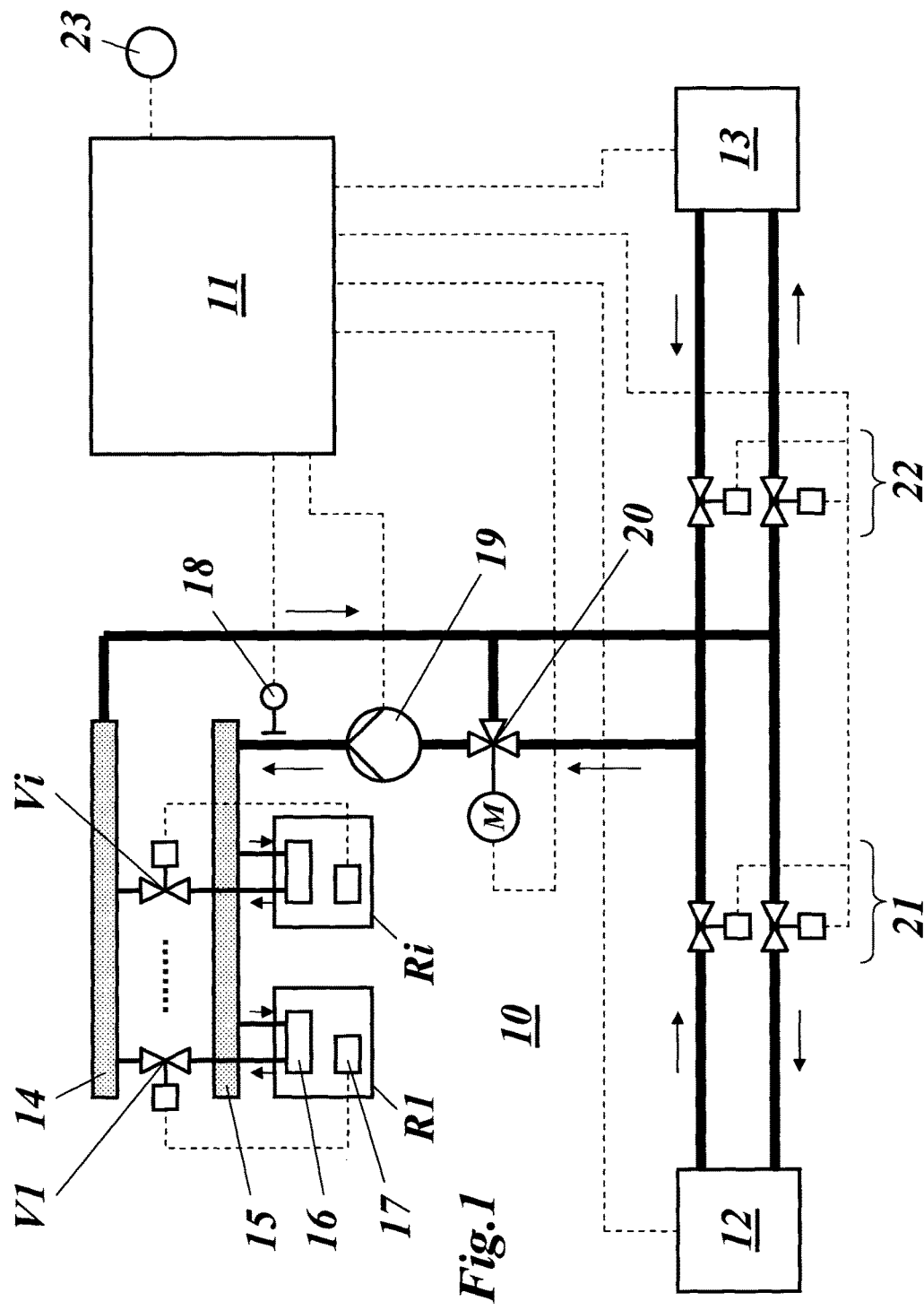
FIG. 1 shows the hydraulic and control schematic of a conventional heating/cooling system based on surface heaters/coolers.
Figure 2:
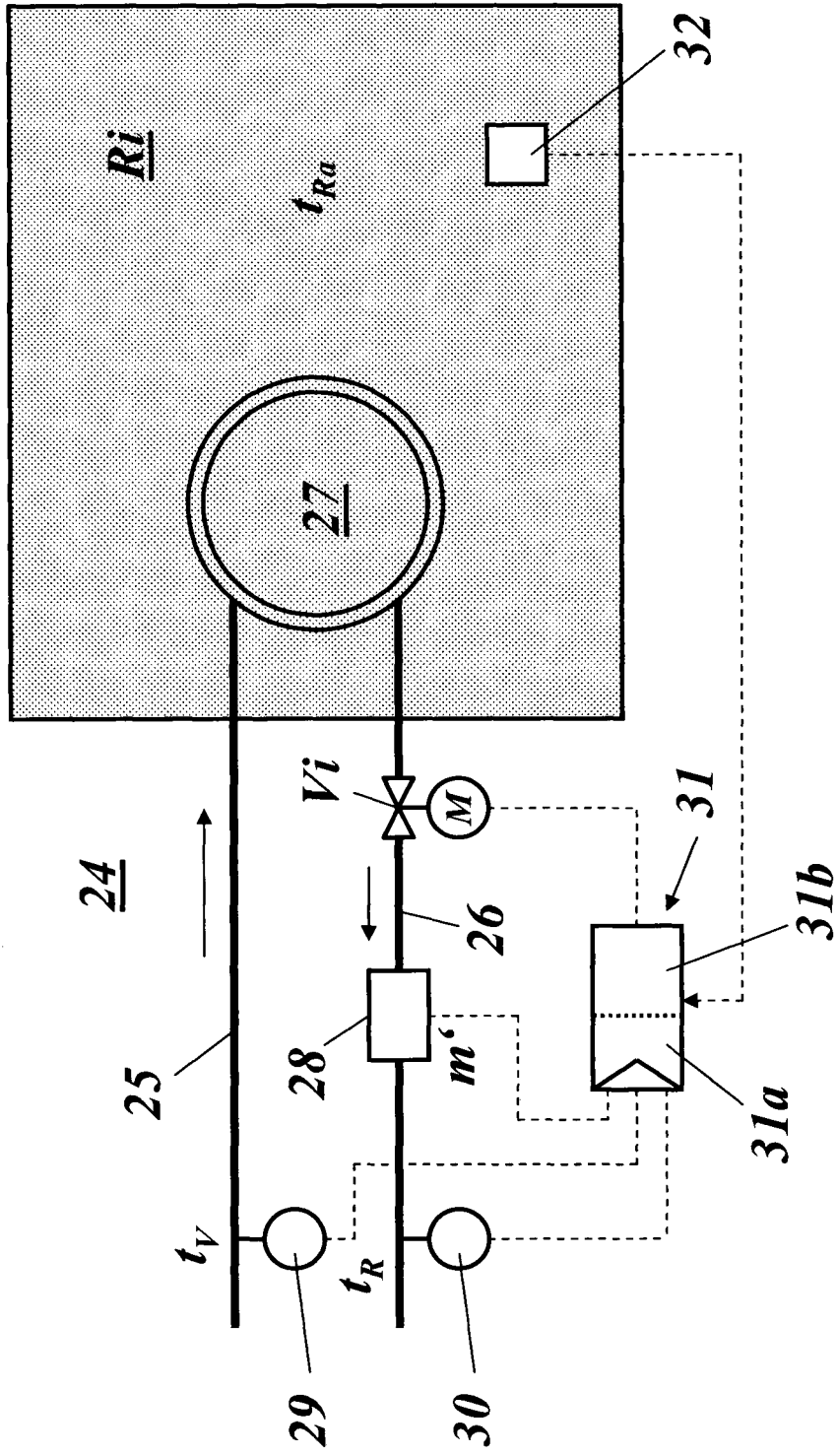
FIG. 2 shows the schematic diagram of an individual regulation of a room with surface heating/cooling according to an exemplary embodiment of the invention.

The individual room temperature regulating apparatus 24 shown in FIG. 2 for the individual room temperature regulation of a single room Ri uniquely assigned to a consumer comprises the devices listed below:

a flow temperature sensor 29 for measuring the flow temperature (tV) of a consumer or of a group of consumers which is (are) arranged in a flow line 25;

A return temperature sensor 30 for measuring the return temperature (tR) of a consumer which is uniquely assigned to a room Ri, in this case a surface heater/cooler 27;

a flow sensor 28 for measuring mass flow (m') of the consumer or of a group of consumers; in the case of a group of consumers, the regulator includes a program code for distributing the measured total mass flow (automatic dynamic balancing, such as is the subject matter of the Swiss patent application No. 01102/11 submitted on 30 Jun. 2011) between the individual consumers which in each case are uniquely assigned to a room Ri;

a control valve Vi with continuous actuation for limiting and regulating the mass flow (m') through a consumer which is uniquely assigned to a room Ri, in this case the surface heater/cooler 27;

(optionally) a control device (setpoint device 32) for shifting the setpoint (adjusting to suit a temporary indisposition), optionally with an integral room temperature measurement for one or a group of rooms; the adjustment to suit a temporary indisposition (setpoint shift) can also be carried out by means of a software interface/web view; and a control unit 31 (in the form of a program code) for individual room temperature regulation taking into account the thermal behavior of a room Ri which is uniquely assigned to a consumer (27), which control unit comprises an assignment part 31a and a regulator part 31b.

Figure 3:
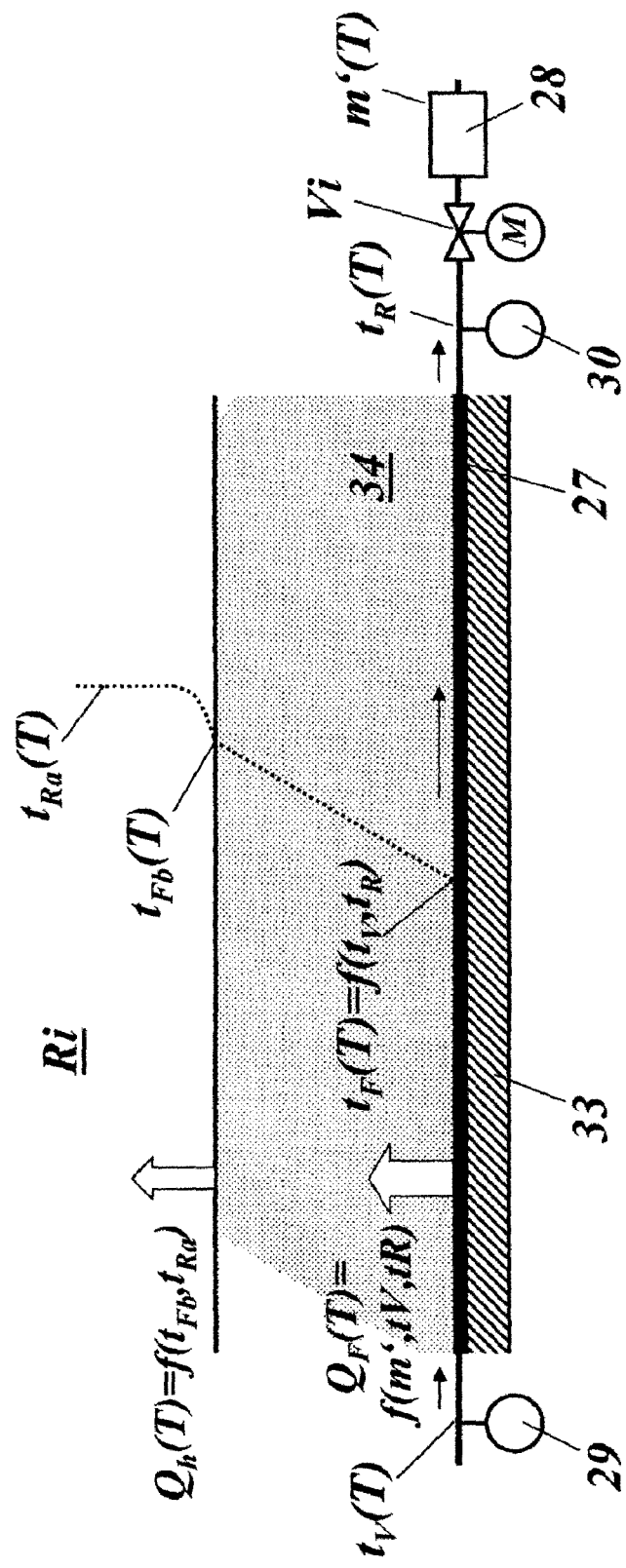
FIG. 3 shows the thermal situation in the region of a floor heater which is based on the invention.

The associated thermal situation in the region of the surface heater/cooler 27 is reproduced schematically in FIG. 3. In quasi-steady-state operation, the heat flow Qh(T), which is dissipated or absorbed by room Ri and is a function of the room temperature tRa and of the floor temperature tFb, corresponds to the heat flow QF(T), which is dissipated or absorbed by fluid flowing through the underfloor heater 27 to the consumer. In this state, the system is in thermal equilibrium, in which there is a clear relationship between fluid temperature tF (mean temperature between flow temperature tV and return temperature tR of the consumer) and the room temperature tRa as a function of the heat flow conducted through the consumer. This relationship is shown schematically in FIG. 3 and applies equally to non-steady-state situations taking into account the thermodynamic relationships.

The program code for regulating the room temperature (control unit 31) takes into account the thermodynamic behavior of the system by means of the configuration or by means of a method integrated within the program code for automatically adjusting the regulation parameters for automatic configuration to suit the system. A relationship between the time-dependent change in the room temperature tRA(T) and the time-dependent behavior of the fluid temperature tF(T) and the heat QF(T) dissipated or absorbed by the fluid in the event of disturbance steps and setpoint changes is therefore stored in the program code for the regulation and is used to regulate the individual room temperature.

As the heat cannot be dissipated directly but has to be conducted through the consumer, the associated storage mass which, in the example of FIG. 3, comprises at least the base layer 33 and the top layer 34, leads to a time delay in the case of non-steady-state operation of the system. With this type of regulation, the flow temperature tV remains unaffected, so that the regulation can be described as return temperature regulation.

An instantaneous room temperature ti,j in the room Ri is assigned in the assignment part 31a of the control unit 31 to the measured values of the flow temperature (tV,j), the return temperature (tR,j) and the mass flow (m'j) determined at a particular time Tj in accordance with the following equation (1):

$$t_{i,j}=0.5\cdot[(t_{V,j}+t_{R,j})-(m'_j/m'_0)\cdot((t_{V,j}-t_{R,j})/(t_{V,0}-t_{r,0}))\cdot(t_{V,0}+t_{R,0}-2t_{i,0})]+t_{corr}(T) \quad (1)$$

With the parameters:
$t_{i,j}$ Current room temperature [° C.]
$t_{i,0}$ Design room temperature [° C.]
$t_{V,j}$ Current flow temperature (group) [° C.]
$t_{R,j}$ Current return temperature (leg) [° C.]
$t_{V,0}$ Design flow temperature [° C.]
$t_{R,0}$ Design return temperature [° C.]
$m'_j$ Current mass flow (leg) [kg/s]
$m'_0$ Design mass flow (leg) [kg/s]

The time-dependent correction term $t_{corr}(T)$ in Equation (1) includes the delay behavior of the surface heater/cooler determined by the thermal storage masses in the event of a step change in the load or setpoint.

The described method for return/room temperature regulation also enables the individual room temperature regulation to be precisely guaranteed, even when there is no suitable place for mounting room temperature sensors. As a result of the control method, it is possible, without additional outlay, to use the current energy demand of each consumer for the overall optimization of the system and to exchange or save (energy) data via a network for further use.

LIST OF REFERENCES

10 Underfloor heating/cooling system
11 Central regulator
12 Heat generator
13 Chiller
14 Return manifold
15 Flow manifold
16 Heat exchanger (pipe coil)
17 Room temperature sensor/thermostat
18 Flow temperature probe
19 Pump
20 3-way valve
21,22 Changeover device
23 Outside temperature probe
24 Individual room temperature regulation apparatus
25 Flow line
26 Return line
27 Surface heater/cooler (e.g. underfloor heater) or heat exchanger
28 Flow sensor
29 Flow temperature sensor
30 Return temperature sensor
31 Control unit (program code)
31a Assignment part
31b Regulator part
32 Setpoint device
33 Base layer
34 Top layer
M Motor
m' Mass flow
QF Fluid heat flow
Qh Room heat flow
R1,Ri Room
tRa,ti Room temperature
tF Fluid temperature
tFb Floor temperature
tV Flow temperature
tR Return temperature
T Time
V1,Vi Control valve

What is claimed is:

1. A method for regulating room temperature in a room or in a group comprising a plurality of rooms, the method comprising:
   regulating a mass flow of a heat-carrying fluid flowing through a heat exchanger or consumer according to a determined current room temperature ($t_{i,j}$);
   determining the current room temperature ($t_{i,j}$), in each case by,
      measuring the mass flow of the heat carrying fluid through the heat exchanger and a flow temperature of the fluid prevailing at the input to the heat exchanger and a return temperature of the fluid prevailing at the output of the heat exchanger; and
      outputting a temperature assigned to the determined values of the mass flow, a flow temperature and the return temperature as the current room temperature and used for said regulation.

2. The method of claim 1, wherein the current room temperature ($t_{i,j}$) is output in accordance with a function $t_{i,j}=F(t_{V,j},t_{R,j},m'_j)+t_{corr}(T)$ in which $t_{V,j}$ and $t_{R,j}$ designate the flow and return temperature respectively and $m'_j$ the mass flow at time $T_j$, and $t_{corr}(T)$ is a time-dependent correction term which takes into account the thermal storage capacity of the respective heat exchanger or consumer.

3. The method of claim 2, wherein the current room temperature ($t_{i,j}$) is output in accordance with the function $t_{i,j}=0.5\cdot[(t_{V,j}+t_{R,j})-(m'_j/m'_0)\cdot((t_{V,j}-t_{R,j})/(t_{V,0}-t_{r,0}))\cdot(t_{V,0}+t_{R,0}-2t_{i,0})]+t_{corr}(T)$ in which $t_{i,0}$ designates a design room temperature, $t_{V,0}$ a design flow temperature, $t_{R,0}$ a design return temperature and $m'_0$ a design mass flow.

4. The method of claim 1, wherein in regulating the room temperature, the flow temperature is identical for all heat exchangers or consumers of a group.

5. The method of claim 1, wherein the mass flow of the heat-carrying fluid through the heat exchanger is changed by means of an associated control valve.

6. The method of claim 1, wherein the heat exchanger is part of a surface heater/cooler.

7. An apparatus comprising:
   a heat exchanger actively connected to a room to be regulated by an input to a flow line and by an output to a return line, a control valve which controls a mass flow through the heat exchanger, a flow temperature sensor which records a flow temperature in the flow line, a return temperature sensor which records a return temperature in the return line, a flow sensor which records the mass flow through the heat exchanger, and a control unit comprising, at least three inputs connected to the flow temperature sensor, the return temperature sensor and the flow sensor, an output actively connected to the control valve, an assignment part configured to assign a room temperature to the values applied to the inputs for the mass flow, the flow temperature and the return temperature, a regulator part configured to actuate the control valve according to a deviation of the assigned room temperature from a prespecified setpoint; and wherein the control unit is configured to:

regulate a mass flow of a heat-carrying fluid flowing through the heat exchanger according to a determined room temperature;

determine the room temperature, in each case by, measuring the mass flow of the heat carrying fluid through the heat exchanger and a flow temperature of the fluid at the input to the heat exchanger and a return temperature of the fluid at the output of the heat exchanger; and outputting the assigned temperature to the determined values of the mass flow, the flow temperature and the return temperature as the current room temperature and used for regulation.

8. The apparatus of claim 7, wherein the flow sensor and the control valve are arranged in the return line.

9. The apparatus of claim 7, wherein the heat exchanger is part of a surface heating/cooling system.

* * * * *